United States Patent

Williams et al.

[11] Patent Number: 5,812,346
[45] Date of Patent: Sep. 22, 1998

[54] HARD DISK DRIVE LATCH WHICH HAS A METAL PLATE ATTACHED TO THE END FACE OF A DAMPING SLEEVE

[75] Inventors: Kelly Williams, Brentwood; Tho Pham, Milpitas, both of Calif.

[73] Assignee: Samsung Electronics, Inc., Richfield Park, N.J.

[21] Appl. No.: 661,399

[22] Filed: Jun. 7, 1996

[51] Int. Cl.$^6$ .................................................. G11B 5/54
[52] U.S. Cl. ............................................................ 360/105
[58] Field of Search ............................................. 360/105

[56] References Cited

U.S. PATENT DOCUMENTS 5,455,728  10/1995  Edwards ................................. 360/105
5,654,852   8/1997  Kitano ................................... 360/105

Primary Examiner—A. J. Heinz
Attorney, Agent, or Firm—Blakely Sokoloff Taylor & Zafman

[57] ABSTRACT

A latch for an actuator arm of a hard disk drive. The latch includes a damping sleeve that is molded onto a steel plate. The sleeve has a pair of collars located at opposite ends of a neck portion. The neck portion is inserted into a plastic fantail portion of an actuator arm. The steel plate becomes attached to a magnetized member of the drive when the actuator arm is rotated to an unloaded position. The attachment of the plate, latches the position of the actuator arm and prevents the disk drive heads from moving onto the data sectors of the disk. The latch is located on the longitudinal center axis of the actuator arm so that the latch does not create a twisting vibrational mode on the arm. The steel plate is located away from the voice coil magnets of the disk drive so that the latch does not create a biasing force on the arm. The latch can be assembled to the actuator arm by merely pressing the damping sleeve into an aperture of a tab that extends from the fantail of the arm.

16 Claims, 1 Drawing Sheet

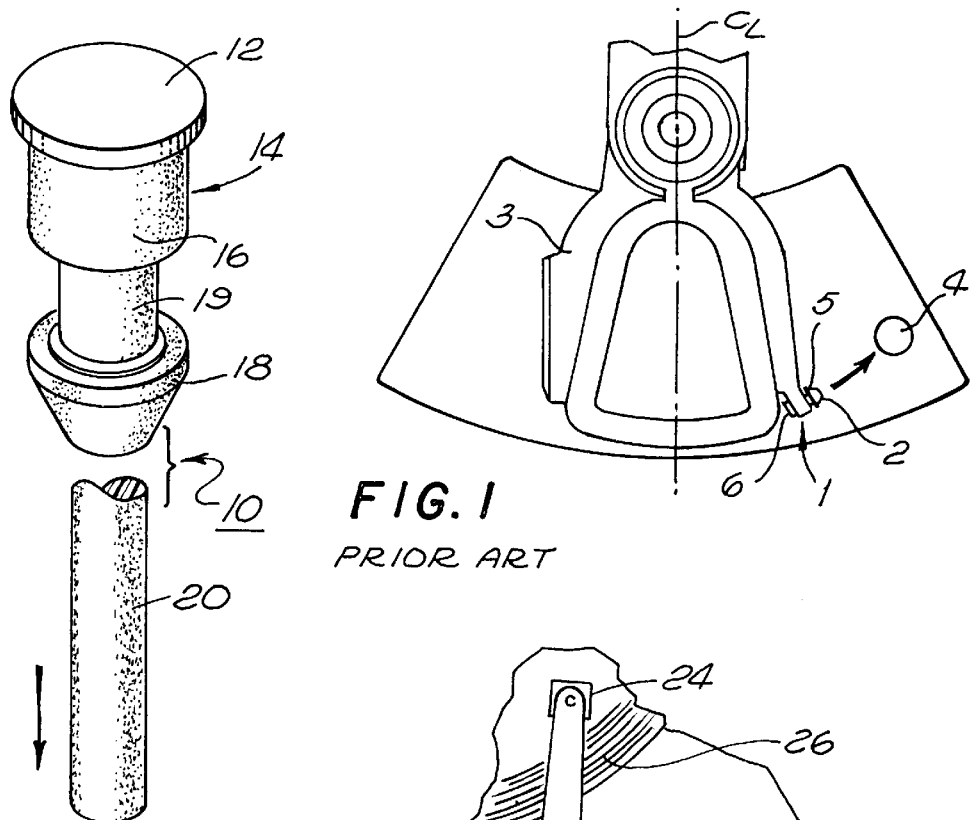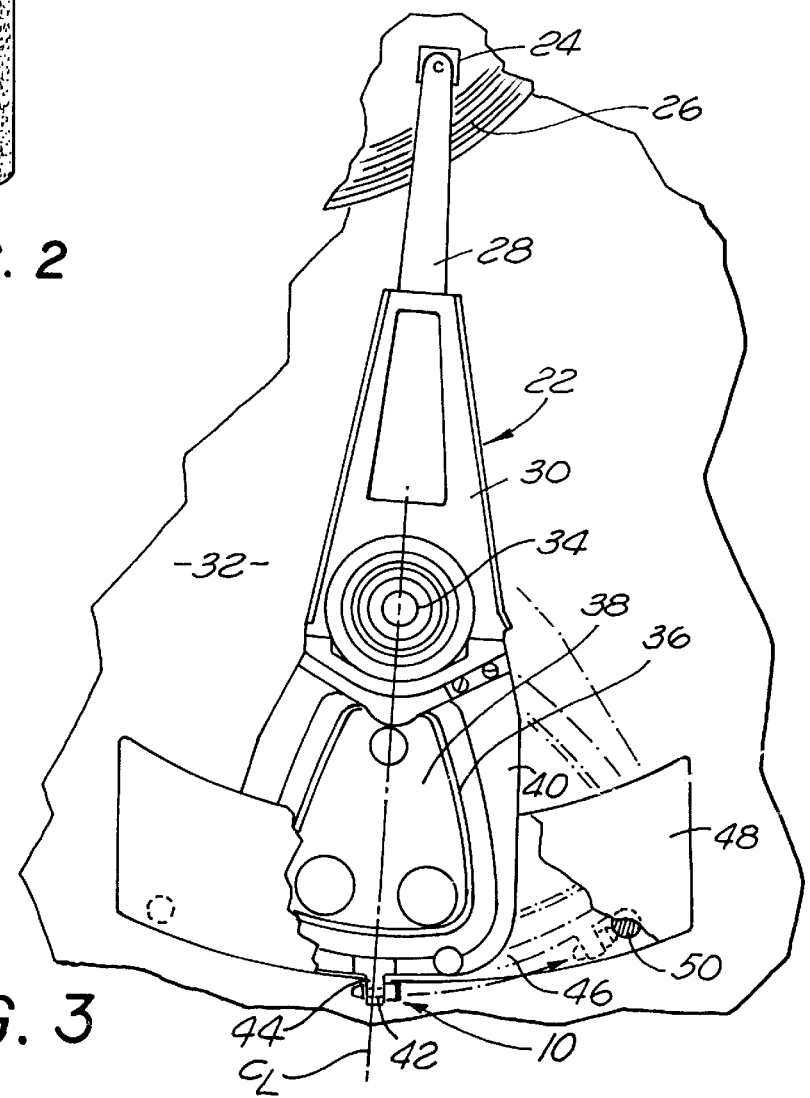

HARD DISK DRIVE LATCH WHICH HAS A METAL PLATE ATTACHED TO THE END FACE OF A DAMPING SLEEVE

BACKGROUND OF THE INVENTION

1. Field of the Invention

The present invention relates to a latch for an actuator arm assembly of a hard disk drive.

2. Description of Related Art

Hard disk drives contain a number of magnetic transducers that are coupled to rotating magnetic disks. The transducers are typically integrated into slider heads that are each mounted to a flexure arm. The flexure arms support the heads above the surfaces of the disks. The flexure arms are attached to an actuator arm that is pivotally mounted to a base plate of the drive. The actuator arm has a voice coil motor which can be excited to move the heads relative to the disks. The heads are moved to a different cylinder of the disk by exciting the voice coil and rotating the actuator arm in a technique commonly referred to as a seek routine.

The sliders have air bearing surfaces which create an air bearing between the transducers and the rotating disks. When the disk drive is powered down, the sliders are moved to a non-data landing zone of the disks. The actuator arm is preferably latched into position to insure that an external shock load does not move the sliders into the data sectors and corrupt the data on the disks.

FIG. 1 shows a latch 1 of the prior art. The latch 1 includes a steel pin 2 that is attached to an actuator arm 3. When the disk drive powers down, the actuator arm 3 rotates the pin 2 into a magnetized member 4. The magnetic force of the member 4 holds the pin 2 and the actuator 3 in a latched position.

The latch assembly includes a damping grommet 5 that dampens the shock created when the pin 2 strikes the magnetized member 4. The steel pin 2 and grommet 5 are attached to the actuator arm 3 by a retaining ring 6. The components of the latch are relatively small, and are thus difficult to manufacture and assemble. It would be desirable to provide a damped latch assembly that is easy to assemble and contains a minimal number of components.

Latch assemblies of the prior art are typically located off the longitudinal axis $C_L$ of the actuator arm. Placing the latch assembly off-center from the longitudinal axis of the actuator arm creates a twisting vibration mode on the arm. The twisting mode is typically a low frequency mode and the most likely to be excited during a seek routine of the drive. The low frequency mode typically requires the manufacturer of the drive to construct the actuator arm from a metal material. It is desirable to construct the actuator from plastic so that the voice coil can be molded into the fantail of the arm to reduce the cost of the drive. Molded arms also provide a more repeatable vibration frequency mode which allows the servo designer to more accurately design servo routines that do not excite the natural frequencies of the arm. Additionally, molded actuators do not have adhesives that out-gas contaminants onto the disks.

Magnetic latches of the prior art are typically located between the voice coil magnets of the drive. The magnets create a magnetic force which pulls the latch and biases the actuator arm. The biasing force increases the complexity of the servo routine required to center the sliders on the tracks of the disks. It would be desirable to provide a plastic molded actuator arm which contains a latch that does not induce a twisting vibration mode, or a biasing force on the arm.

SUMMARY OF THE INVENTION

The present invention is a latch for an actuator arm of a hard disk drive. The latch includes a damping sleeve that is molded onto a steel plate. The sleeve has a pair of collars located at opposite ends of a neck portion. The neck portion is inserted into a plastic fantail portion of an actuator arm. The steel plate becomes attached to a magnetized member of the drive when the actuator arm is rotated to an unloaded position. The attachment of the plate, latches the position of the actuator arm and prevents the disk drive heads from moving onto the data sectors of the disk. The latch is located on the longitudinal center axis of the actuator arm so that the latch does not create a twisting vibrational mode on the arm. The steel plate is located away from the voice coil magnets of the disk drive so that the latch does not create a biasing force on the arm. The latch can be assembled to the actuator arm by merely pressing the damping sleeve into an aperture of a tab that extends from the fantail of the arm.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 1 is a top view of a latch assembly of the prior art;

FIG. 2 is a perspective view of a latch assembly of the present invention;

FIG. 3 is a top view of the latch assembly in a hard disk drive.

DETAILED DESCRIPTION OF THE INVENTION

Referring to the drawings more particularly by reference numbers, FIG. 2 shows a latch 10 of the present invention. The latch 10 maintains the position of an actuator arm of a hard disk drive. The latch 10 includes a plate 12 that is attached to a damping sleeve 14. The sleeve 14 is preferably constructed from an elastomeric material which can be insert molded with the steel plate 12. The elastomeric material will absorb and dampen any external force that is applied to the plate 12. The plate 12 is constructed from a material such as steel that is magnetically attracted to a magnetized member.

Located at one end of the sleeve 14 is a cylindrical collar 16 which absorbs the shock loads applied to the plate 12. Located at the other end of the sleeve 14 is a conical shaped collar 18 that is separated from the cylindrical collar 16 by a neck portion 19. The conical collar 18 is flexible enough to be pushed through an actuator arm aperture which has a diameter that is smaller than the major diameter of the collar 18. The sleeve 14 may be initially constructed to have a pull stem 20 which extends from the conical collar 18. The pull stem 20 may be grabbed by a tool to pull the sleeve 14 into the aperture. The pull stem 20 is typically removed after the latch 10 is assembled to an actuator arm.

FIG. 3 shows the latch 10 assembled to an actuator arm assembly 22. The actuator arm assembly 22 supports a plurality of slider heads 24 located adjacent to a plurality of magnetic disks 26. The sliders 24 are typically mounted to flexure arms 28 that are attached to an actuator arm 30. The actuator arm 30 is pivotally connected to a base plate 32 by a bearing assembly 34 which allows the sliders 24 to move across the surfaces of the disks 26.

The assembly 22 includes a voice coil 36 which is wrapped around a bobbin 38 and captured by a fantail 40 of the actuator arm 30. The fantail 40 is preferably constructed from a plastic material so that the voice coil 36 can be insert molded into the arm 30. Insert molding the voice coil 36 eliminates the need for adhesives that may out-gas contaminants onto the disks. The light plastic material also reduces the inertia of the arm and provides an assembly which has a fast servo response time. The insert molded voice coil also provides a manufactured product with repeatable vibration modes so that a servo routine can be more accurately developed for the disk drive.

The latch 10 is pressed into an aperture 42 of a tab 44 that extends from the fantail 40. The latch 10 is located on a longitudinal center axis $C_L$ of the actuator arm 30. Locating the latch 10 on the center axis prevents the latch 10 from creating a side twisting vibrational moment on the arm 30.

The latch 10 can be assembled by inserting the pull stem 20 through the aperture 42 and pulling the sleeve 14 until the conical collar 18 is pulled through the tab 44. The pull stem 20 is then removed from the sleeve 14. The collars 16 and 18 are located on each side of the tab 44 to capture the latch 10 onto the actuator arm 30.

The voice coil 36 is located between a pair of permanent magnets 46. The magnets 46 are attached to plates 48 that are mounted to the base plate 32 of the drive. The magnets 46 are magnetized to move the actuator arm 30 when a current is provided to the voice coil 36. The sliders 24 can be moved relative to the disks 26 by exciting the voice coil 36. The voice coil 36 and magnets 46 are commonly referred to as a voice coil motor.

The latch 10 is located outside of the magnets 46. Locating the latch 10 away from the magnets 46 reduces any magnetic biasing force on the latch 10 created by the attractive pull of the magnets on the steel plate 12. Reducing the biasing force also reduces the complexity of the servo routine required to center the sliders 24 on the tracks of the disks 26.

The magnets 46 and plates 48 are separated by posts 50. The steady magnetic fields of the magnets 46 magnetize the posts 50. When the latch 10 is moved into contact with one of the posts 50, the magnetic field holds the steel plate 14 and latches the actuator arm assembly 22 into position.

In operation, when the disk drive is powered down, the voice coil motor moves the sliders 24 to a non-data area typically located at the inner diameter of the disks 26. Rotation of the actuator arm 30 moves the latch 10 into contact with the magnetized post 50. The magnetized post 50 holds the latch 10 and maintains the position of the sliders 24 in the non-data portion of the disks when the drive is powered down. The latch 10 can be decoupled from the post 50 by creating a torque on the actuator arm 30 which overcomes the attractive magnetic force of the post 50 and latch 10.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A latch for an actuator arm of a hard disk drive, comprising:
    a damping sleeve that has a pair of collars that are separated by a neck portion, wherein one of said collars has an end face; and
    a metal plate that is attached to said end face of said damping sleeve.

2. The latch as recited in claim 1, wherein said damping sleeve has a cylindrical shaped collar and a conical shaped collar.

3. The latch as recited in claim 2, wherein said damping sleeve has a pull stem that extends from one of said collars.

4. An actuator arm assembly for a hard disk drive, comprising:
    an actuator arm
    a voice coil attached to said actuator arm;
    a damping sleeve that is attached to said actuator arm, said damping sleeve having a pair of collars that are separated by a neck portion, wherein one of said collars has an end face; and,
    a metal plate that is attached to said end face of said damping sleeve.

5. The assembly as recited in claim 4, wherein said latch is inserted into a tab of said actuator arm.

6. The assembly as recited in claim 5, wherein said tab extends from a fantail of said actuator arm.

7. The assembly as recited in claim 4, wherein said damping sleeve has a cylindrical shaped collar and a conical shaped collar.

8. The assembly as recited in claim 7, wherein said damping sleeve has a pull stem that extends from one of said collars.

9. A hard disk drive, comprising:
    a base plate;
    a disk mounted to said base plate;
    an actuator arm pivotally mounted to said base plate;
    a slider mounted to said actuator arm and coupled to said disk;
    a plate mounted to said base plate;
    a post which separates said plate from said base plate;
    a magnet mounted to said plate, said magnet providing a magnetism to said post of said plate;
    a voice coil that is attached to said actuator arm; and a latch comprising
    a damping sleeve that is attached to said actuator arm, said damping sleeve having a pair of collars that are separated by a neck portion, wherein one of said collars has an end face; and,
    a metal plate that is attached to said end face of said damping sleeve.

10. The assembly as recited in claim 9, wherein said latch is inserted into a tab of said actuator arm.

11. The assembly as recited in claim 10, wherein tab extends from a fantail of said actuator arm.

12. The assembly as recited in claim 11, wherein said damping sleeve has a cylindrical shaped collar and a conical shaped collar.

13. The assembly as recited in claim 9, wherein said damping sleeve has a pull stem that extends from one of said collars.

14. A method for attaching a latch to a hard disk drive actuator arm that has a tab with an aperture, comprising the steps of:
    a) providing a latch that includes a metal plate that is attached to a damping sleeve which has a pair of collars that are separated by a neck portion; and,
    b) inserting said damping sleeve into the aperture of the tab so that said collars are located on opposite sides of the tab.

15. The method as recited in claim 13, wherein said damping sleeve is pulled through the aperture.

16. The method as recited in claim 13, wherein said latch is attached to a longitudinal center axis of the actuator arm.

* * * * *